United States Patent
Haesendonckx

(10) Patent No.: US 6,745,492 B1
(45) Date of Patent: Jun. 8, 2004

(54) PROCESS AND INSTALLATION FOR MANUFACTURING A PREFORM, IMPLEMENTING IMPROVED DRYING MEANS, AND PLASTIC RECEIPIENT OBTAINED FROM THE PREFORM

(75) Inventor: Frank Haesendonckx, Veurne (BE)

(73) Assignee: Schmalbach-Lubeca AG (DE)

( * ) Notice: Subject to any disclaimer, the term of this patent is extended or adjusted under 35 U.S.C. 154(b) by 0 days.

(21) Appl. No.: 09/856,870

(22) PCT Filed: Nov. 25, 1999

(86) PCT No.: PCT/EP99/09655

§ 371 (c)(1),
(2), (4) Date: Aug. 30, 2001

(87) PCT Pub. No.: WO00/30822

PCT Pub. Date: Jun. 2, 2000

(30) Foreign Application Priority Data

Nov. 25, 1998 (FR) ............................................. 98 15002

(51) Int. Cl.⁷ ............................................... F26B 17/12
(52) U.S. Cl. ......................... 34/168; 34/112; 264/328.1
(58) Field of Search .......................... 34/168, 165, 167, 34/524, 527, 112; 264/54, 39, 328.1, 328.17

(56) References Cited

U.S. PATENT DOCUMENTS

| 4,185,060 A | * | 1/1980 | Ladney, Jr. ................... 264/54 |
| 4,609,721 A | * | 9/1986 | Kirshenbaum et al. ..... 528/285 |
| 4,876,043 A | * | 10/1989 | Hall, Sr. ...................... 264/39 |
| 5,165,941 A | * | 11/1992 | Hawley ....................... 425/148 |
| 5,846,607 A | * | 12/1998 | Hurley et al. ............. 427/374.2 |
| 6,056,901 A | * | 5/2000 | Hamatani et al. ......... 264/37.28 |
| 6,095,785 A | * | 8/2000 | Kudert et al. ................ 425/130 |
| 6,391,408 B1 | * | 5/2002 | Hutchinson ................. 428/35.7 |

* cited by examiner

Primary Examiner—Henry Bennett
Assistant Examiner—Camtu Nguyen
(74) Attorney, Agent, or Firm—Harness, Dickey & Pierce, P.L.C.

(57) ABSTRACT

The process for manufacturing a preform from at least one thermoplastic resin in the form of granules (A) and in a substantially crystalline state, comprises following successive operations are carried out:

drying the thermoplastic resin in the form of granules;

melting the dried granules of resins;

injecting the melted resin into a mould and removing the preform from the mould;

The drying operation is carried out in at least two successive separate steps:

in a first step (first hopper 5), the granules of resin substantially in a crystalline state are dried for a predetermined duration (t1) at a predetermined drying temperature (T1);

in a second step (second hopper 5'), the drying of the granules from the first step is continued at a drying temperature (T2) that is markedly higher than the drying temperature (T1) of the first stage, and for a duration (t2) that is markedly shorter than the period (t1) of the first step.

4 Claims, 1 Drawing Sheet

PROCESS AND INSTALLATION FOR MANUFACTURING A PREFORM, IMPLEMENTING IMPROVED DRYING MEANS, AND PLASTIC RECEIPIENT OBTAINED FROM THE PREFORM

BACKGROUND AND SUMMARY OF THE INVENTION

The present invention relates to a process for manufacturing a preform obtained by injecting into a mould at least one thermoplastic resin, in a substantially crystalline state, as well as to an installation for implementing this process. It also relates to the plastic recipient obtained by drawing and blowing in a mould a preform manufactured according to the process of the invention. The invention resides more precisely in an improvement made to the operation of drying the resin in the form of granules, which drying operation is carried out prior to injecting the resin into the mould. The invention will primarily, but not exclusively, find an application in the manufacture of plastic preforms and recipients, based on at least one polyethylene terephthalate resin (PET), that have a low acetaldehyde (AA) content, which makes them primarily, although not exclusively, suitable for storing mineral water.

In the packing industry, and more especially in the field of bottling, the use of plastic recipients that are obtained by drawing and blowing a preform in a mould is very widespread. Usually, the preform is obtained by injecting one or more thermoplastic resins into a mould. Those thermoplastic resins most commonly used to date, on account of their low cost price, are polyethylene terephthalate (PET) homopolymer or copolymer based resins. These PET resins have, however, the major drawback of being permeable to gases, in particular to oxygen and carbon dioxide. When it is wished to obtain recipients having specific functional properties that cannot be obtained with PET resins, more specific thermoplastic resins having the properties sought after are used to manufacture the preform. For example, when it is wished to produce a plastic recipient having improved gas barrier properties, it is known to use specific thermoplastic resins such as polyamide resins containing m-xylylene groups and commonly referred to as "MX-nylon", resins based on a vinyl alcohol and ethylene copolymer and, for example, EVOH resins, or again, polyethylene 2,6-naphthalene dicarboxylate (PEN) resins, etc. These specific resins can be used by being mixed, prior to injection, with a PET or similar resin, the mixture obtained usually being injected into a mould to produce the preform. More commonly, these specific resins are used for the manufacture of preforms having a multilayer structure, by sequential and/or parallel co-injection of a specific resin and of a PET or similar resin.

Usually, the thermoplastic resin or resins, which are used to manufacture a preform, have a degree of crystallisation greater than 50% and initially take the form of solid granules. These granules, which are in a substantially crystalline state, are obtained in a known manner by subjecting granules of resin in an amorphous state to a heat treatment in the granule manufacturing step. Granules of resin in an amorphous state have the drawback of tending to stick together and form agglomerates. This preliminary step of crystallisation of these resin granules, which is implemented during the granule manufacturing step, advantageously makes it possible to obtain resin granules which, owing to their crystalline state, no longer tend to agglomerate together. One example of a process of crystallisation of polyester resin granules is described, in particular, in European patent application EP-A-0 379 684. In this publication, the polyester resin granules in a crystalline state are obtained by subjecting polyester resin granules in an amorphous state to a heat treatment taking place in two successive steps.

To manufacture a preform from a thermoplastic resin substantially in a crystalline state and in the form of granules, the following successive operations are performed:
- melting and mixing the resin granules by passing them through a screw type extruder;
- injecting the melted resin from the extruder into a mould.

As a rule, the aforementioned step of melting and mixing the granules of resin at the time of manufacturing a preform is preceded by a step of storing these resin granules in a substantially crystalline state, which may vary in length, depending on the particular case. The thermoplastic resins most commonly used to manufacture the preforms and, in particular, PET resins, absorb the moisture of the atmosphere when stored in the form of granules for a certain time. This moisture present in the resin, because of the high temperatures used to produce the melting of the resin granules and to inject the melted resin into the preform mould, generates degradation through hydrolysis of the resin. This degradation by hydrolysis is all the more marked the greater the moisture content of the resin and/or the higher the resin heating temperatures. This hydrolytic degradation of the resin undesirably results in a reduction in the weight of the molecule of the resin, thus reducing the intrinsic viscosity of the resin and the associated properties. Now, it is known that an excessive loss of intrinsic viscosity can impair the quality of the preform obtained and, in particular, can impair the transparency of the preform and can lead to a loss of the mechanical properties of the bottle obtained from the preform. It is thus essential for preform manufacturers to reduce this phenomenon of degradation through hydrolysis of the resin as far as possible. For this purpose, prior to transformation of the resin by passing through the extruder screw, the granules of resin in a crystalline state are dried in a preliminary operation, which makes it possible to reduce the relative moisture content of the resin granules. To date, this drying operation has been carried out by passing the resin granules through a drying hopper, the output of which is connected to the input of the extruder, and which delimits an internal drying chamber brought to a given temperature, by means of a flow of dry, hot air that is continually renewed.

During the process of manufacturing a preform, the resin or resins used also undergo thermal degradation, which occurs chiefly when the resin passes through the screw extruder. This thermal degradation is harmful as it leads, on one hand, to a loss of the physical properties of the resin, reflected, in particular, in a loss of intrinsic viscosity, the appearance of traces of crystallinity on the preform or again, a change in the colour of the preforms and, on the other hand, to the formation of undesirable by-products. In particular, in the case of a PET resin, one of the undesirable by-products resulting from the thermal degradation of the resin is acetaldehyde ($CH_3CHO$), which is produced chiefly in gaseous form, and which is characterized by a fruity smell and taste. The acetaldehyde ends up in the walls of the recipient that is produced from the preform, and it migrates, during storage, in contact with the product stored in the recipient. If the acetaldehyde content is too high, the result is a substantial deterioration in the taste of the product stored, a deterioration in taste that can be undesirably perceived by the consumer. In the case of a PET resin, it is thus important to ensure that as little acetaldehyde as possible is generated. It is vital to maintain a very low acetaldehyde content when the product stored in the recipient is one with little taste, such as, for example, mineral water. This is why, in the particular field of mineral water storage, bottlers impose on their suppliers of PET based bottles a maximum acetaldehyde content that must not be exceeded.

One of the difficulties of the operation of drying granules of resin in a crystalline state lies in the choice of temperature and the duration of drying in the hopper. To ensure that the water absorbed by the resin is efficiently removed, and to bring the relative moisture content of the resin down to acceptable levels, the temperature and the drying time have to be sufficient. Conversely, the temperature and the drying time must be sufficiently reduced to limit as far as possible any thermal and hydrolytic degradation of the resin at the stage of the drying operation. In the case of PET resins, for example, it is now known that the hydrolysis of these resins in a solid state can begin at a temperature of 150° C., admittedly at a slow rate, but one that depends on the temperature and increases as the temperature rises. This is why it is preferred, to date, to limit the drying temperature for PET resins to levels such that the resin at the output from the drying hopper is at a temperature of less that 150° C. As a rule, the drying air introduced into the hopper is brought to a temperature in the order of 140° C., which corresponds to a resin temperature in the order of 135° C., and the drying time for PET resins is generally between 6 and 8 hours.

The invention provides a process for manufacturing a preform from at least one thermoplastic resin, substantially in a crystalline state, the step of drying which has been improved. In the present text, a resin "substantially" in a crystalline state is to be taken as meaning a resin having a degree of crystallinity higher than 50%.

As known to date, the manufacturing process according to the invention includes the following successive operations:

drying the thermoplastic resin substantially in a crystalline state and in the form of granules;

melting the dried granules of resins;

injecting the melted resin into a mould and removing the preform from the mould.

In a characteristic, novel manner according to the invention, the drying operation is carried out in at least two successive separate steps.

in a first step, the granules of resin substantially in a crystalline state are dried for a predetermined duration ($t1$) at a predetermined drying temperature ($T1$);

in a second step, the drying of the granules from the first step is continued at a drying temperature ($T2$) that is markedly higher than the drying temperature ($T1$) of the first stage, and for a duration ($t2$) that is markedly shorter than the period ($t1$) of the first step.

The advantage of dividing the drying operation into at least two separate steps is that it permits better optimisation of the resin drying process. During the resin drying process, the risk of its hydrolytic degradation is, in fact, maximum at the start of drying, when the relative moisture content of the resin is highest, and it declines as the drying process progresses, the relative moisture content of the resin gradually decreasing. Conversely, the risk of thermal degradation of the resin is smaller, even non-existent, at the beginning of the drying process, but increases during the drying process owing to the reduction of the resin's relative moisture content. Thanks to the process according to the invention, as, at the time of the first drying-step, the risks of hydrolytic degradation predominate, a drying temperature is chosen that is sufficiently low to preclude, or at the very least limit, hydrolytic degradation of the resin. At the end of the first step, the relative moisture content of the resin having dropped, it becomes advantageously possible to operate at a higher drying temperature, without any risk of major hydrolytic degradation of the resin. The duration of this second step in the drying operation must, however, be sufficiently short to preclude, or at the very least limit, thermal degradation of the resin, which is predominant at this stage in the drying process in relation to hydrolytic degradation.

Thanks to the process according to the invention, it becomes advantageously possible to operate with a drying temperature (the temperature of the second drying step) that is higher than the drying temperatures used to date, and without harm in terms of thermal and hydrolytic degradation of the resin during the drying operation. The main result of this is that one can obtain, at the end of the drying operation, dried granules of resin the temperature of which is higher than with the prior art is process. Comparatively speaking, if, using the prior art process, one attempted to apply a higher drying temperature, identical with the drying temperature used in the second step of the process according to the invention, more extensive hydrolytic degradation of the resin would be undesirably caused during the drying operation than in the process according to the invention, as well as thermal degradation that would be at least comparable with that of the process according to the invention and, in all probability, more extensive.

Thanks to the invention, by obtaining a higher resin temperature at the exit from the drying operation, the following resin melting and mixing operation advantageously requires less thermal and mechanical energy. Incidentally, it becomes possible to contemplate reducing the resin heating temperature, that is to say, in practice, the temperature of the screw extruder, without any deterioration in the resin melting process, which makes it possible to reduce thermal degradation of the resin when it is transformed and, through this very fact, to reduce the production of undesirable degradation by-products in the course of the preform manufacturing process. It is for the person skilled in the art to fix the parameters ($t1$, $T1$, $t2$, $T2$) of the process according to the invention, on a case by case basis, according to the installation used for manufacturing the preforms and to the type of thermoplastic resin used.

The invention also relates to the plastic recipient obtained by drawing and blowing in a mould a preform manufactured according to the aforementioned process, as well as to an installation for implementing this process.

The installation according to the invention usually comprises means for drying the thermoplastic resin in the form of granules and in a substantially crystalline state, the output of which is connected to the input of an extruder, which extruder feeds, at its output, an injection mould.

Characteristically, according to the invention, the drying means comprise:

at least two successive drying hoppers, namely a first drying hopper provided for processing one volume of resin ($V1$) and a second drying hopper provided for processing a volume of resin ($V2$) that is markedly smaller then the volume ($V1$) processed by the first hopper;

means enabling the first drying hopper to be fed with the thermoplastic resin in the form of granules;

means enabling the granules of resin from the first hopper to be directed to the input of the second hopper;

means enabling a drying gas to be circulated inside the first drying hopper, and a drying gas to be circulated inside the second drying hopper;

first heating means designed to bring the drying gas, introduced into the first hopper, to a drying temperature (T1); and second heating means designed to bring the drying gas introduced into the second hopper to a drying temperature (T2) that is markedly higher than the drying temperature (T1) of the first heating means.

BRIEF DESCRIPTION OF THE DRAWING

Other characteristics and advantages of the invention will emerge more clearly from a study of the following description of the structure and of the operation of an installation according to the invention, which description is given with reference to the annexed drawing, wherein.

DETAILED DESCRIPTION OF THE PREFERRED EMBODIMENTS

Figure 1:
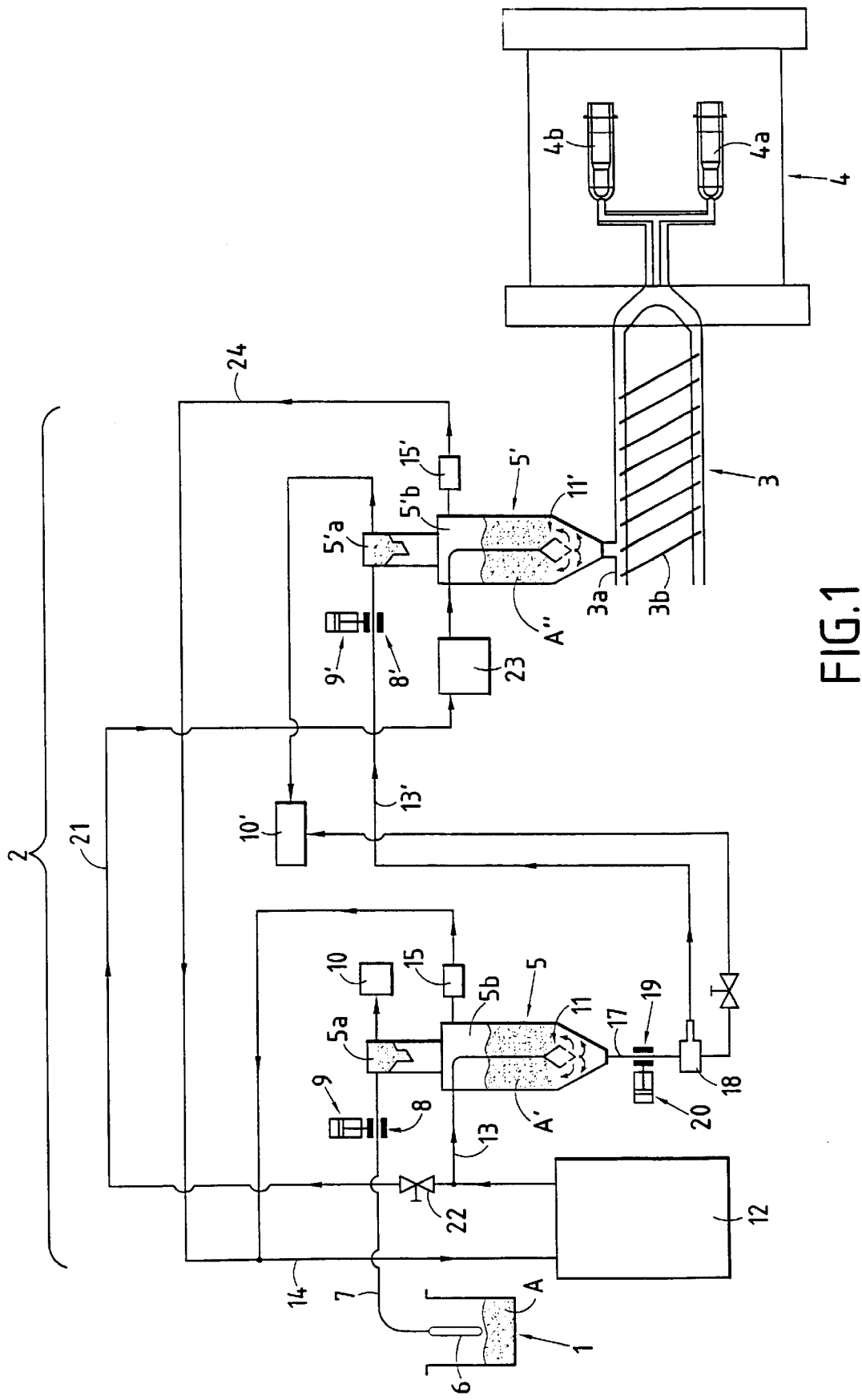
FIG. 1 is an overview diagram of a particular form of embodiment of an installation according to the invention.

The installation shown in FIG. 1 enables preforms to be manufactured by injecting into a mould a thermoplastic resin in a substantially crystalline state such as, for example, a PET resin. The thermoplastic resin used is initially stored in a silo 1 in the form of solid granules A. The installation uses means 2 for drying the resin granules A, a screw extruder 3 the function of which is to melt the dried resin granules from the drying means 2, and to direct the melted resin to the input of an injection mould 4. The structure and the operation of screw extruder 3 and of injection mould 4 are perfectly well known, and will not be detailed in the present description; only drying means 2, which are characteristic of the invention, will be described in detail hereinafter. It should, however, be emphasized that, in the particular example illustrated, injection mould 4 comprises two injection cavities, 4a and 4b, and, in the usual way, enables two preforms to be manufactured in parallel at each injection cycle. It is perfectly clear that the number of injection cavities does not limit the invention, this number being arbitrary. In general, for productivity reasons, an injection mould will comprise a far greater number of cavities in parallel.

According to one essential characteristic of the invention, drying means 2 of the installation use two successive drying hoppers: a main hopper 5 and a secondary hopper 5'.

Main drying hopper 5 and the associated means permitting its operation are conventional. Said main hopper 5 comprises an upper chamber 5a which is designed to be fed with the resin granules A from silo 1, and a lower chamber 5b which is larger in volume, for drying the resin granules. A suction nozzle 6 mounted inside silo 1 is connected by a conduit 7 to the input of upper chamber 5a of hopper 5. Conduit 7 is equipped with a closing/opening member 8 which can be actuated by a pneumatic jack 9, which permits control over the feeding of hopper 5 with resin granules A, by controlling the opening or closing of feed conduit 7. A vacuum pump 10 is connected to upper chamber 5a. When vacuum pump 10 operates and conduit 7 is not closed, resin grains A from silo 1 are drawn into conduit 7 and conveyed into upper chamber 5a, and then drop into drying chamber 5b, where they accumulate. In drying chamber 5b is further mounted a level sensor (not shown), which enables the level of resin in the drying chamber to be detected. When the installation starts up, conduit 7 is opened and vacuum pump 10 is brought into operation so as to fill drying chamber 5b until the level of resin detected therein reaches a predetermined minimum set threshold. Once this threshold has been reached, conduit 7 is closed automatically, which halts the supply of resin granules. Subsequently, during the process, when the level of resin detected is again below said threshold, conduit 7 is re-opened automatically, so as to feed resin granules to hopper 7, during a given period of time, which can be adjusted, for example, by means of a time-out device. Once this period of time has elapsed, conduit 7 is closed automatically, which interrupts the supply of resin granules, until the resin level detected is once more below the minimum set threshold. During the process, a volume (V1) of resin granules A' is thus automatically maintained inside drying chamber 5b that is substantially constant and predetermined.

To dry resin granules A' contained in drying chamber 5b, hopper 5 is equipped with means enabling renewed dry hot air to be circulated continuously inside the drying chamber. These means are known and will thus now be described very briefly. They comprise a blowing nozzle 11 which is mounted inside drying chamber 5b, and which is connected to a drying unit 12 via a heat insulated conduit 13. Drying chamber 5b of hopper 5 is further connected to drying unit 12, via a conduit 14 equipped with filtering means 15. The drying unit constitutes a known assembly which, on one hand, makes it possible to blow continuously through conduit 13, towards nozzle 11, hot air brought to a predetermined, adjustable temperature and which, on the other hand, makes it possible to recover by suction, via conduit 14, the air inside drying chamber 5b that has become laden with moisture through contact with resin granules A'. This moist hot air is regenerated by drying unit 12, by passing, in particular, through a drying cartridge (not shown), before being blown once more towards drying chamber 5b of hopper 5.

In the same way as the main drying hopper 5, secondary drying hopper 5' comprises an upper chamber 5'a and a lower drying chamber 5'b. Upper chamber 5'a is connected, in order to be fed with resin granules, to the output of drying chamber 5b of main hopper 5, by means of a heat insulated transport duct 13'. More precisely, the output from drying chamber 5b of main hopper 5 is connected by a conduit 17 to the input to a suction chamber 18, the output of which is connected to transport duct 13'. Conduit 17 is equipped with a closing/opening member 19 which can be actuated by a pneumatic jack 20. In the same way as with main drying hopper 5, secondary drying hopper 5' is equipped with a vacuum pump 10', a closing/opening member 8' actuatable by a pneumatic jack 9', and mounted on transport duct 13', and with a nozzle 11' for blowing dry, hot drying air into drying chamber 5'b. Vacuum pump 10' is connected not only to upper chamber 5'a of hopper 5' but also to suction chamber 18.

Secondary hopper 5' is also equipped with a sensor (not shown) which enables the level of resin contained inside drying chamber 5'b to be detected. When the level of resin detected inside drying chamber 5'b is below a predetermined minimum threshold, members 19 and 8' are actuated automatically to take up their open positions; the suction chamber, in which a a negative pressure is created by vacuum pump 10', enables granules of resin A' located at the lower part of drying chamber 5a of main hopper 5 to be drawn in and to be introduced into transport duct 13'. As a negative pressure is also created in the transport duct by vacuum pump 10', these resin granules are directed to upper chamber 5'a of secondary hopper 5', and drop into drying chamber 5'b. At the end of a period of time that is predetermined and adjustable, for example, by a time-out means, members 19 and 8' are automatically actuated to take up their closed positions, which isolates secondary hopper 5' from hopper 5, the supply of resin granules to the secondary hopper being interrupted until the level of resin detected in drying chamber 5'*b* is once more lower than or equal to the minimum set threshold. During the process, a volume (V2) of resin granules A" that is substantially constant and predetermined is thus maintained automatically inside drying chamber 5'*b*.

In order to be supplied with hot, dry drying air, blowing nozzle 11' of secondary hopper 5' is connected to drying unit 12 by means of a conduit 21 that is heat insulated and equipped with a closing valve 22. Thus, when valve 22 is open, a part of the hot, dry air that is blown by drying unit 12 is directed towards main hopper 5, while the other part of this drying air is directed towards secondary drying hopper 5'. In addition, before being introduced into drying chamber 5'*b* of secondary hopper 5', the hot, dry drying air supplied by drying unit 12 is subjected to additional heating by passing through a heating chamber 23, provided immediately upstream of secondary drying hopper 5'. The heating means of heating chamber 23 are adjusted in such a way that the air that is blown by nozzle 11' into secondary hopper 5' is brought to a drying temperature (T2) that is markedly higher than the drying temperature (T1) of the air blown by nozzle 11 into main hopper 5. To permit recovery inside drying chamber 5'*b* of the hot air that has become laden with moisture from being in contact with resin granules A", drying chamber 5'*b* is connected to drying unit 12 by means of conduit 24.

In the example illustrated in FIG. 1, secondary hopper 5' is mounted directly on extruder 3, the output from drying chamber 5'*b* being connected to the inside of heating chamber 3*a* which serves to house rotary extruder screw 3*b*. The risks of heat loss to the granules of resin A" when they are transferred between secondary hopper 5' and extruder 3 are thus advantageously reduced to a minimum. Such a construction can only be contemplated, however, with a secondary drying hopper having a small volume, that is to say when the quantity of resin necessary for each injection cycle is small or, in other words, when the number of cavities in the injection mould is small. According to another embodiment of the invention, and, in particular, when drying hopper 5' has a large volume, it can be contemplated having this secondary hopper 5' positioned above extruder 3 and connected thereto by a flexible conduit, which is heat insulated and the length of which is preferably reduced to a minimum.

The installation that has just been described with reference to FIG. 1 makes it possible to manufacture preforms from granules A of a thermoplastic resin stored in silo 1, according to a process the main steps of which are as follows. In a first step, granules A of resin, which, during their storage, have absorbed the moisture of the surrounding air, are dried as they pass through main drying hopper 5. This first drying step is conducted at a predetermined drying temperature (T1) (temperature of the drying air from nozzle 11) and for a duration (t1). The duration of drying (t1) in main hopper 5 is a function of the volume (V1) of resin processed in hopper 5 and of the production rate, that is to say of the quantity of resin melted per unit of time that is introduced into injection mould 4 by extruder screw 3. This quantity of resin per unit of time is a function, in particular, of the time of the injection cycle, of the weight of each preform, and of the number of cavities of the mould, that is to say of the number of preforms manufactured at each injection cycle. In a second drying stage, granules A' of resin from the first drying step undergo complementary drying by passing through secondary drying hopper 5'. This second drying step is conducted at a predetermined drying temperature (T2) (temperature of the drying air from the nozzle 11'.) that is markedly higher than the drying temperature (T1) of the first drying step, and for a duration of drying (t2) that is markedly lower than the duration of drying (t1) of the first drying step. The duration of drying (t2) in secondary hopper 5' is a function of the volume (V2) of resin processed in hopper 5' and of the production rate of the installation. In a third step, granules A" of resin from secondary hopper 5' are mixed and melted by passing through extruder 3, heating chamber 3*a* of extruder 3 being equipped in a conventional manner with heating collars (not shown) that enable the granules of resin to be brought to a temperature higher than their melting temperature; extruder screw 3*b* enables these granules of resin to be mixed and advanced towards injection mould 4. The fourth and final step takes the form, in a conventional manner, of injection of the melted resin into cavities 4*a* and 4*b* and of removal of the preforms from the mould after it has been opened.

The preforms obtained are then used to manufacture recipients in the conventional way, by being heated, and then mechanically drawn and blown in a blow mould. As this manufacturing process is well-known, it will not be presented in the present description.

The main advantage of the invention is that it makes it possible, thanks to the division of the resin drying operation into two separate steps, to ensure better optimisation of resin drying and, through this very fact, to obtain a higher resin temperature at the exit from the drying operation while, at the same time, keeping thermal and hydrolytic degradation of the resin during drying down to a low level. A higher resin temperature at the exit from the drying operation means a higher resin temperature at the start of extrusion. As a result, the melting of the resin as it passes through the extruder necessitates less energy to transform the resin. It is thus possible to reduce the temperature for heating the resin during extrusion and, through this very fact, to reduce thermal degradation of the resin during extrusion, which is reflected, in particular, by less generation of undesirable by-products during the preform manufacturing process.

In a precise exemplary embodiment, the process according to the invention was implemented in the laboratory, with an installation according to that shown in FIG. 1, to manufacture PET preforms. The PET resin used was an EK 9921W type resin, the intrinsic viscosity of which, according to the specifications of the resin supplier, was between 0.80 and 0.82. The average size of the resin granules was 3 mm. The degree of crystallinity of the resin granules was in the order of 55%. The relative moisture content of the resin granules, immediately prior to the drying operation, was approximately 0.5% (5000 ppm).

The extruder used was a HUSKY (XL160T) machine. At each injection cycle, two preforms, each weighing approximately 44 g, were manufactured. The quantity of resin melted per unit of time at the exit from extruder 3 was in the order of 17.5 kg/h. Main drying hopper 5 was designed to dry a volume (V1) of resin of approximately 150 liters. Drying time in main hopper 5 was in the order of 7 hours. Secondary drying hopper 5' was designed to dry a volume (V2) of resin of approximately 50 liters. The drying time in secondary hopper 5' was in the order of 2.4 hours. The temperature (T1) of the drying air from blowing nozzle 11 of main hopper 5 was approximately 150° C. The temperature of the granules of resin A' at the output from the main hopper was in the order of 145° C. The relative moisture content of the granules of resin at the output from secondary hopper 5' was approximately 30 ppm. Different tests, whereof the results of the experiments are summarised in the following table, were carried out, varying the temperature of the resin granules at the input to the extruder (column V), the heating temperature of the extruder (column VI) and the speed of rotation of the extruder screw (column VII). In the following table, the data in % of column VII correspond, in practice, to an item of control data of the extruder used (a HUSKY XL160T machine) that can be parameterised at the input by the operator, and which enables the speed of rotation of the screw to be adjusted. The temperature (T2) of the drying air from nozzle 11' of secondary hopper 5 was approximately 5° C. higher than the temperature (column V) of the resin measured at the output from secondary hopper 5. The temperature of the resin granules at the input to the extruder was equal to the temperature of the resin at the output from secondary hopper 5'.

RESULTS OF EXPERIMENTS

| Test No. | (I) AA concentration (ppm) cavity (3a) | (II) AA concentration (ppm) cavity (3b) | (III) AA (ppm) | (IV) Intrinsic viscosity | (V) Resin temp. | (VI) Extruder temp. | (VII) Screw speed |
|---|---|---|---|---|---|---|---|
| 1 | 7.29 | 7.69 | 7.49 | 0.826 | 153° | 280° | 15% |
| 2 | 7.34 | 7.51 | 7.43 | 0.826 | 164° | 280° | 15% |
| 3 | 4.56 | 5.03 | 4.80 | 0.840 | 164° | 270° | 15% |
| 4 | 4.67 | 4.75 | 4.71 | 0.840 | 156° | 270° | 15% |
| 5 | 12.73 | 13.25 | 12.99 | 0.828 | 157° | 290° | 15% |
| 6 | 12.63 | 12.02 | 12.33 | 0.841 | 163° | 290° | 15% |
| 7 | 12.24 | 13.52 | 12.88 | 0.837 | 172° | 290° | 15% |
| 8 | 8.12 | 7.61 | 7.87 | 0.789 | 173° | 280° | 15% |
| 9 | 4.81 | 5.13 | 4.97 | 0.815 | 174° | 270° | 15% |
| 10 | 4.61 | 4.87 | 4.74 | 0.817 | 175° | 270° | 10% |
| 11 | 4.54 | 4.39 | 4.47 | 0.816 | 175° | 270° | 10% |

For each test, in order to characterise the thermal and hydrolytic degradation of the resin, measurements were taken, for each preform obtained, of the acetaldehyde content (AA), using gas phase chromatography (columns I, II and III), and of the intrinsic viscosity of the resin. The data in column III corresponds to the mean value of the concentrations (AA) of columns I and II. The data in column IV corresponds to the mean value of intrinsic viscosity levels measured for the two preforms manufactured in each test.

The above experimental results show that the optimum temperature of the resin at the input to the extruder permitting optimum limitation of resin degradation during the process was between 155° C. and 165° C. (tests 3 and 4). It also seems that the temperature of the extruder has a major influence on the thermal degradation of the resin (comparison of tests 1 and 2 with tests 3 and 4). In the tests conducted, the optimum extruder temperature was 270° C.

It is for a person skilled in the art to fix, case by case, the optimum temperature and drying time values, for each of the drying steps, as a function of the resin used. In the case of a PET homopolymer or copolymer resin, the duration of the first drying step will preferably be between 6 hours and 7 hours and the drying temperature (T1) will preferably be between 145° C. and 155° C., which corresponds to a resin temperature at the exit from the first drying step of between 140° C. and 150° C.; the duration of the second drying step will preferably be between 1 hour and 3 hours and, better still, between 1 hour and 2 hours and the drying temperature (T2) of the second drying step will be fixed so as to obtain at the input to the extruder a resin temperature of between 155° C. and 165° C. and, preferably, in the order of 160° C.

In the particular exemplary embodiment described with reference to the figure, the preform manufacturing process was of the type involving mono-injection of a single resin. The invention can, however, also be applied to a process for manufacturing preforms by the co-injection (parallel and/or sequential) of several resins. The process according to the invention is not limited, either, to the use of a PET resin and can be applied to the drying, prior to extrusion and injection in a preform mould, of any thermoplastic resin subject, through the effect of heat and moisture, to degradation by hydrolysis and thermal degradation during the preform manufacturing process. Furthermore, the invention is not limited to a drying operation conducted in two successive steps; it can be carried out, in another variant, using three, or more than three, successive drying steps.

What is claimed is:

1. A process for manufacturing a preform from pellets, of at least one thermoplastic resin, substantially in a crystalline state wherein the thermoplastic resin is a PET homopolymer or copolymer resin, comprising the steps of:
   drying the pellets in drying means the output of which is connected to an extruder;
   melting the dried pellets of resin in the extruder; and
   injecting the melted resin into a mould and removing the preform from the mould; wherein the drying operation is carried out in at least two successive separate steps, thereby raising the temperature of the pellets prior to extrusion:
      a first step, wherein the pellets of resin substantially in a crystalline state are dried for a predetermined duration at a predetermined drying temperature, wherein the duration of the first driving step is between 6 hours and 7 hours, and the driving temperature of the first driving step is fixed at a value such that the temperature of the pellets at the output from the first drying step is between 140° C. and 150° C.; and
      a second step, wherein the drying of the pellets from the first step is continued at a drying temperature that is strictly higher than the drying temperature of the first stage, and for a duration that is strictly shorter than the period of the first step, wherein the duration of the second driving step is between 1 hour and 3 hours, and the driving temperature of the second drying step is determined in such a way as to obtain, at the beginning of the following melting step, a pellet temperature of between 155° C. and 165° C.

2. The process according to claim 1 wherein said preform is drawn and blown in a mould.

3. The process according to claim 1 wherein the duration of the second drying step is preferably between 1 hour and 2 hours.

4. The process according to claim 1 wherein the pellet temperature is preferably in the order of 160° C.

* * * * *